(12) United States Patent
Honsinger et al.

(10) Patent No.: US 6,212,302 B1
(45) Date of Patent: Apr. 3, 2001

(54) METHOD AND APPARATUS FOR VISUALLY OPTIMIZED RATE CONTROL

(75) Inventors: Chris W. Honsinger, Webster; Majid Rabbani, Pittsford; Paul W. Jones, Churchville, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/222,190

(22) Filed: Dec. 29, 1998

(51) Int. Cl.$^7$ ...................................................... G06K 9/36
(52) U.S. Cl. ........................................... 382/232; 382/251
(58) Field of Search .................................. 382/232, 251, 382/252, 253, 244; 348/78

(56) References Cited

U.S. PATENT DOCUMENTS

| | | | |
|---|---|---|---|
| 4,780,761 | * 10/1988 | Daly et al. ............................ | 358/133 |
| 6,111,990 | * 8/2000 | Sugaya et al. ........................ | 382/250 |

OTHER PUBLICATIONS

Ramchandran et al., "Rate–Distortion Optimal Fast Thresholding with Complete JPEG/MPEG Decoder Compatibility", IEEE Transactions on Image Processing, vol. 3, No. 5., pp. 700–704, Sep. 1994.*

Monro et al., "Optimal Quantization Strategy for DCT Image Compression", IEE Proc.—Vis. Image signal Process., vol. 143, No. 1, pp. 10–14, Feb. 1996.*

Livny et al., "Quality Controlled Compression of Sets of Images", IEEE, Proceedings of Intern Workshops on Multimedia Database Management Systems, pp. 109–114, 1996.*

Boden, "Quantization Distortion in Block Transform–Compressed Data", IEEE, Proceedings, Data Compression Conference, p. 427, 1995.*

Hwang et al., "Optimal Variable Quantization for JPEG Extensions", IEEE Proceedings og International Conference on Consumer Electronics, pp. 266–267, 1995.*

Sherlock et al., "A Model for JPEg Quantization", IEEE Proceedings, ISSI 1994 International Symposium on Speech, Image Processing and Neural Networks, vol. 1, pp. 176–179, Apr. 1994.*

Wallace et al., "The JPEG Still Picture Compression Standard", IEEE Transactions on Consumer Electronics, vol. 38, No. 1, pp. xviii–xxxiv, Feb. 1992.*

* cited by examiner

Primary Examiner—Jose L. Couso
Assistant Examiner—Anh Hong Do
(74) Attorney, Agent, or Firm—Peyton C. Watkins (57) ABSTRACT

A method selecting a quality parameter for use in compressing a digital image, the method comprises the steps of creating a plurality of quantizer parameter sets, each having a corresponding quality parameter; compressing the digital image with the plurality of quantizer parameter sets for providing a corresponding plurality of compressed file sizes; creating a rate-distortion curve from the plurality of quantizer parameter sets and the corresponding compressed file sizes; providing a maximum and minimum quality parameters; providing a target compressed file size; and selecting a quality parameter based on the rate distortion curve, the maximum and minimum quality parameters and the target compressed file size.

8 Claims, 6 Drawing Sheets

METHOD AND APPARATUS FOR VISUALLY OPTIMIZED RATE CONTROL

CROSS-REFERENCE TO RELATED APPLICATIONS

The present application is related to U.S. application Ser. No. 09/222,483 (D.78075/PCW), filed December 1998, by Chris W. Honsinger, et al., titled, "METHOD FOR EFFICIENT RATE CONTROL"; and, U.S. application Ser. No. 09/223,073 (D.78922/PCW), filed December 1998, by Paul W. Jones, et al., titled, "METHOD AND APPARATUS FOR VISUALLY OPTIMIZED COMPRESSION PARAMETERS".

FIELD OF THE INVENTION

The current invention relates generally to the field of image processing, and, in particular, to a method of controlling the rate and quality of compressed images.

BACKGROUND OF THE INVENTION

The advent of the Internet coupled with dramatic improvements in software and printing technologies is causing a migration from local printing presses to the semi-automated high-speed and high-volume shops that can be located virtually anywhere in the world. Printer manufacturers, in order to succeed in this new paradigm, are required to make faster and cheaper printers while maintaining the high levels of image quality required by various applications. Consequently, there is an ever increasing need for image compression, not just for storage considerations, but also for enabling the digital circuitry to keep up with the extremely high data rates dictated by the printing process.

These factors impose a strict requirement on the robustness and speed of the compression technology used in these systems. Many printing applications have a strict requirement on the minimum compressed data rate in order to enable the high-speed printing process while at the same time, they also require very high quality decompressed images. Unfortunately, these two requirements are often in direct conflict with one another. In fact, a key factor in the design of many high-speed printing systems is the development of a compression strategy that reduces the amount of compressed data to or below a desired compressed file size (or equivalently, the desired data rate), while still achieving a minimum (or better) level of quality. The current invention deals with the development of such a compression strategy.

A popular technique for the compression of continuous tone images is the JPEG international compression standard. (Digital compression and coding of continuous-tone still images—*Part I: Requirements and Guidelines (JPEG)*, ISO/IEC International Standard 10918-1, ITU-T Rec. T.81, 1993, or W. B. Pennebaker and J. L. Mitchell, *JPEG Still Image Data Compression Standard*, Van Nostrand Reinhold, New York, 1993). Briefly, when using JPEG compression, the digital image is formatted into 8×8 blocks of pixel values, and a linear decorrelating transformation known as the discrete cosine transform (DCT) is applied to each block to generate 8×8 blocks of DCT coefficients. The DCT coefficients are then normalized and quantized using a frequency-dependent uniform scalar quantizer.

In the JPEG standard, the user can specify a different quantizer step size for each coefficient. This allows the user to control the resulting distortion due to quantization in each coefficient. The quantizer step sizes may be designed based on the relative perceptual importance of the various DCT coefficients or according to other criteria depending on the application. The 64 quantizer step sizes corresponding to the 64 DCT coefficients in each 8×8 block are specified by the elements of an 8×8 user-defined array, called the quantization table or "Q-table". The Q-table is the main component in the JPEG system for controlling the compressed file size and the resulting decompressed image quality.

Each block of the quantized transform coefficients is ordered into a one-dimensional vector using a pre-defined zig-zag scan that rearranges the quantized coefficients in the order of roughly decreasing energy. This usually results in long runs of zero quantized values that can be efficiently encoded by runlength coding. Each nonzero quantized value and the number of zero values preceding it are encoded as a runlength/amplitude pair using a minimum redundancy coding scheme such as Huffman coding. The binary coded transform coefficients along with an image header containing information such as the Q-table specification, the Huffman table specification, and other image-related data are either stored in a memory device or transmitted over a channel.

As mentioned previously, the ability to trade off image quality for compressed file size in JPEG is accomplished by manipulating the elements of the Q-table. In general, each of the 64 components of the Q-table can be manipulated independently of one another to achieve the desired image quality and file size (or equivalently, the desired compression ratio or bit rate) or image quality. However, in most applications, it is customary to simply scale all of the elements of a basic Q-table with a single constant. For example, multiplying all elements of a given Q-table by a scale factor larger than unity would result in a coarser quantization for each coefficient and hence a lower image quality. But at the same time, a smaller file size is achieved. On the other hand, multiplication by a scale smaller than unity would result in a finer quantization, higher image quality, and a larger file size. This scaling strategy for trading image quality for compressed file size is advocated by many developers of JPEG compression products including the Independent JPEG Group (IJG) whose free software is probably the most widely used tool for JPEG compression. A current version of the software is available at the time of this writing from ftp://ftp.uu.net/graphics/jpeg/. The IJG implementation scales a basic Q-table by using a parameter known as the "IJG quality setting", which converts a value between 1 and 100 to a multiplicative scaling factor.

In many applications, an image needs to be JPEG-compressed to a pre-specified file size. This problem is sometimes referred to as "rate control". In the prior art, JPEG rate control is typically accomplished by compressing the image multiple times until the desired file size is achieved. First, the image is compressed using a basic Q-table, e.g., one that has been designed for that application or the example tables given in the JPEG standard specifications. If the target file size is not achieved, the components of the Q-table are appropriately scaled based on a pre-defined strategy, and the image is compressed again with the scaled Q-table. This process is repeated until the compressed file size is within an acceptable range of the target file size.

A limitation of this and similar rate control methods is that they often do not provide a means for guaranteeing the resulting compressed image quality, nor do they provide a means for handling those situations where compressing to the specified file size results in a quality that is (a) unacceptable for the application, or (b) higher than the highest quality needed for the application.

A central aspect of the current invention is providing a flexible rate control strategy whereby the user can specify minimum and maximum compressed image quality parameters to perform tradeoffs between compressed file size and visual distortion in a perceptually optimal manner.

SUMMARY OF THE INVENTION

The present invention is aimed at providing a flexible rate control strategy that allows a user to tradeoff compressed file size for visual image quality in a fast and perceptually optimum manner.

According to a preferred embodiment of this invention, a plurality of Q-tables, corresponding to different levels of visual quality, are generated and each Q-table is indexed with a quality parameter. An example of a quality parameter is the viewing distance for which the image (which has been compressed and decompressed using the corresponding Q-table) will manifest no perceptual loss if viewed by an observer. This viewing distance is referred to as the threshold viewing distance for the corresponding Q-table. In the present invention, the user specifies two quality parameters to the system. These parameters correspond to the highest level of quality that is needed and the lowest level of quality that the user is willing to accept in his application. The user also inputs a target file size.

For each original image to be compressed, the following procedure is used. First, a small set of image pixel blocks are randomly chosen and compressed with the plurality of Q-tables, each of which is indexed by a quality parameter, to determine compressed file size as a function of the quality parameter (e.g., by constructing a relational curve or a lookup table). This function is referred to as the "operational R-D curve" of the particular image being compressed. Based on this function, a quality parameter for compressing the original image to the target file size is derived. Next, this derived quality parameter is compared to the two quality parameters that have been specified by the user. Three situations can occur as a result of this comparison:

(i) The derived quality parameter corresponds to a higher level of quality than the highest quality level specified by the user. In this case, the operational R-D curve is used to choose a Q-table that corresponds to the highest quality level specified by the user. Consequently, the file size will be smaller than the target file size, but the maximum specified image quality will still be obtained;

(ii) The derived quality parameter falls between the two levels of quality specified by the user. In this case, the operational R-D curve is used to choose a Q-table that corresponds to the derived quality parameter. Consequently, the target file size will be achieved, within the accuracy of the operational R-D curve; and, (iii) The derived quality parameter corresponds to a lower level of quality than the lowest quality level specified by the user. In this case, a warning message to the user is generated, and a user-specified procedure is followed. Examples of such procedures include, but are not limited to: (a) compressing the image with the Q-table corresponding to the lowest acceptable quality, thus resulting in a larger file size than targeted; but still satisfying the quality requirement; or (b) compressing the image with the derived Q-table, thus resulting in a lower quality than is acceptable by the system; but still satisfying the file size requirement.

These and other aspects, objects, features and advantages of the present invention will be more clearly understood and appreciated from a review of the following detailed description of the preferred embodiments and appended claims, and by reference to the accompanying drawings.

ADVANTAGES OF THE PRESENT INVENTION

The present invention offers an advantages over prior art by providing a means of flexible rate control strategy whereby the user can specify minimum and maximum compressed image quality parameters to perform tradeoffs between compressed file size and visual distortion in a perceptually optimal manner.

DETAILED DESCRIPTION OF THE INVENTION

Figure 1:
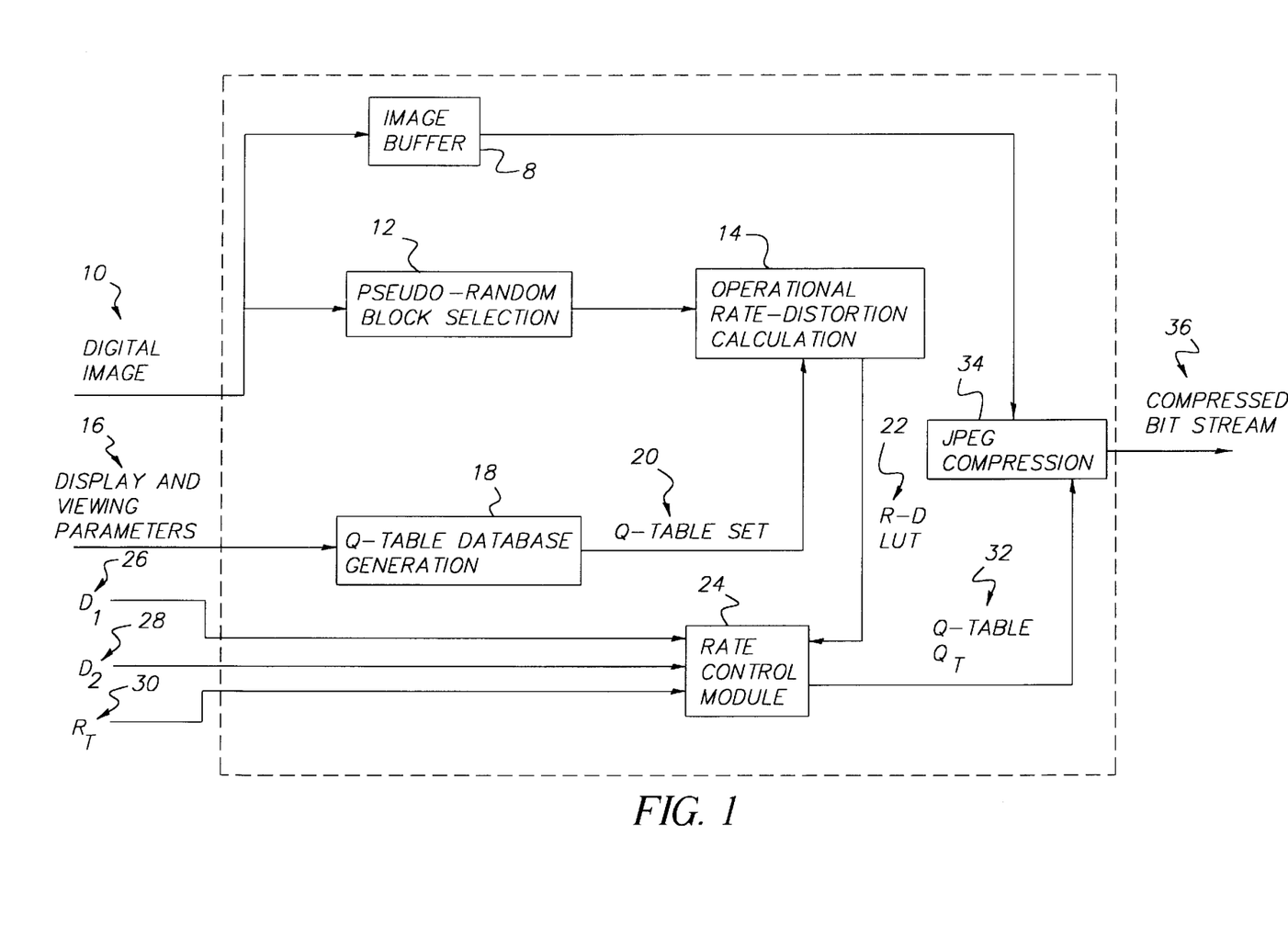
FIG. 1 is a system level block diagram of the preferred embodiment of the invention.

FIG. 1 depicts a system level block diagram of the preferred embodiment of the present invention. We first describe the general function of the various blocks in FIG. 1 and then describe each individual block in more detail. While a high-speed printer is used as the example application in our preferred embodiment, it is understood that the methods described herein can be applied to digital cameras, software applications, satellite transmission systems or any imaging apparatus requiring a quality controlled use of compression.

Referring to FIG. 1, a digital image (10) is sent as input to a pseudo-random block selection module (12). The output of this module is a small set of image pixel blocks that have been pseudo-randomly chosen. The computational complexity of obtaining an operational R-D curve for the digital image (10) is significantly reduced by compressing only the blocks in the output of module (12) instead of the entire image. The digital image (10) is also sent to a frame buffer (8) to allow later access to the image data when compressing the full image.

In a preferred embodiment of this invention, response characteristics of the human visual system (HVS) are used to derive a plurality of Q-tables. In generating the appropriate Q-table values from an HVS model, parameters for the viewing conditions and display rendering are required. These parameters are input to a Q-table generation module (18) that constructs a set of Q-tables (20) based on a wide range of assumed threshold viewing distances, and each Q-table is indexed by a quality parameter. The set of Q-tables (20) and their corresponding quality parameters are stored in memory as a lookup table (LUT) where each Q-table is indexed by its associated quality parameter. These Q-tables, when used in compressing an image, will create a wide range of compressed file sizes. In a preferred embodiment of the present invention, the Daly visual system model described in U.S. Pat. No. 4,780,761 (also refer to "Application of a noise-adaptive contrast sensitivity function to image data compression," Optical Engineering, Volume 19, number 8, pages 979–987, August 1990) is used in conjunction with a range of threshold viewing distances extending from 0.5 inches to 20.0 inches and spaced at 0.5 inch intervals. The quality parameter used to index the $i^{th}$ Q-table, $Q_i$, is the corresponding threshold viewing distance $D_i$.

The randomly selected blocks are sent as input to the operational R-D calculator module (14) where they are JPEG-compressed with the set of Q-tables (20). For each Q-table $Q_i$, the compressed rate for each randomly selected block is combined to produce an estimated compressed file size $R_i$. While file size is used as the example application in our preferred embodiment, it is understood that the methods described herein can be applied to bit rate or compression ratio to produce the same effect. The resulting set of data pairs (quality parameter, file size) constitute the control points for constructing the operational R-D characteristics of the input image (10). A continuous operational R-D curve can be constructed by using piecewise-polynomials to approximate the points between the control points. Alternatively, the discrete set of data pairs can be saved in a lookup table (LUT) and subsequently used to approximate the missing points in the R-D curve. In a preferred embodiment of the present invention, the operational R-D curve is stored as a LUT (22) containing the control points ordered as $(D_i, R_i)$, where $D_i$ denotes the viewing distance that was used to generate the Q-table $Q_i$ that results in compressed file size $R_i$.

The R-D LUT (22) and the three user defined parameters, $D_1$, $D_2$, and $R_T$, are input into the rate control module (24). $D_1$ (26) and $D_2$ (28) are quality parameters that correspond, respectively, to the maximum and the minimum quality that the user is willing to tolerate or allow. The specification of a maximum quality can be used to prevent a superfluous amount of compressed bits. The saved bandwidth can be used by the system to begin processing the next image, for example. The $R_T$ (30) parameter corresponds to the target file size. The rate control module (24) uses the R-D LUT (22) and the input parameters (26, 28, 30) to select a Q-table $Q_T$ (32). In a preferred embodiment of the current invention, the $D_1$ and $D_2$ parameters correspond, respectively, to the smallest and the largest threshold viewing distances that are allowed by the application.

Finally, the Q-table $Q_T$ (32) selected by the rate control module is input into the JPEG compressor (34) to compress the input image. The final output is the compressed bit stream (36). In the following, the various modules of FIG. 1 are explained in more detail.

As mentioned before, the purpose of the pseudo-random block selector (12) in FIG. 1 is to reduce the amount of computation needed to obtain an operational R-D curve for the digital image (10) by selecting only a small portion of the image pixels to be compressed. However, in order to obtain an accurate R-D curve, the R-D characteristics of the reduced image data as it pertains to JPEG compression needs to resemble that of the original image.

To illustrate this point further, consider a simple case where our objective is to reduce the number of pixels compressed by module (14) by a factor of $n^2$. A simple way of achieving this would be to uniformly sub-sample the original image by a factor of n in each direction, e.g., by retaining every $n^{th}$ pixel of every $n^{th}$ line. The resulting reduced resolution image can then be divided into 8×8 blocks and compressed with the JPEG standard. However, the sub-sampling process results in a significant reduction in correlation between adjacent pixels. Consequently, the R-D characteristics of this reduced image would be significantly different from that of the original image.

To avoid this problem, in a preferred embodiment of the present invention, the reduced image data samples are obtained as 8×8 blocks of contiguous image pixels in the original image. However, the specific method used in selecting the blocks can also significantly impact the resulting R-D characteristics. Consider the case where the 8×8 block samples are gathered by a uniform sub-sampling of the 8×8 blocks in the original image by a factor of n in each direction, e.g., by retaining every $n^{th}$ 8×8 block of every $n^{th}$ 8-pixel horizontal strip of the image. Although this procedure would work on most images, there would also be images where this procedure would fail to capture the complete statistics. As an example, consider gathering 8×8 block samples at every 80 pixels of an image of a wooden fence with vertical posts occuring at every 80 pixels. The statistics of the image would weigh heavily toward the compression characteristics of the wooded fence posts and would not necessarily be representative of the entire image.

In an effort to alleviate this problem, one might consider sampling the original image at random locations. However, based on our experience, pure randomness in the sampling process can be as inadequate in capturing the proper statistics as uniform sampling is, especially when the image is comprised of several distinct scenes or sub-images. As an example, consider sampling a magazine page, where the page might consist of two distinct areas: a continuous-tone photograph on one side, and text on the other side. A purely random sampling of this image might fail to capture 50% of the blocks from each side of the image as is needed for the proper R-D characterization.

In order to address the above issues, in a preferred embodiment of the present invention, we adopt a sampling strategy that combines the best features of both strategies described above, i.e., we sample uniformly over a large scale while we sample randomly over a small scale. More specifically, in reference to FIG. 2, we first break the image into M×M contiguous square regions (42) where M is larger than 8 (e.g., M=64) but is smaller than the image dimensions. By using square regions, we guarantee that the horizontal image content is sampled with the same fidelity as the vertical. Scanning the image from left to right and from top to bottom, we randomly select one 8×8-block from each M×M square region. This results in a factor of (M/8)×(M/8) reduction in the number of blocks compared to the original image. For example, using M=64 with a 4096 pixels×5248 lines image results in a total of (4096/64)×(5248/64), or 5248, 8×8-blocks and a 64:1 reduction in data compared to the original image.

Figure 2:
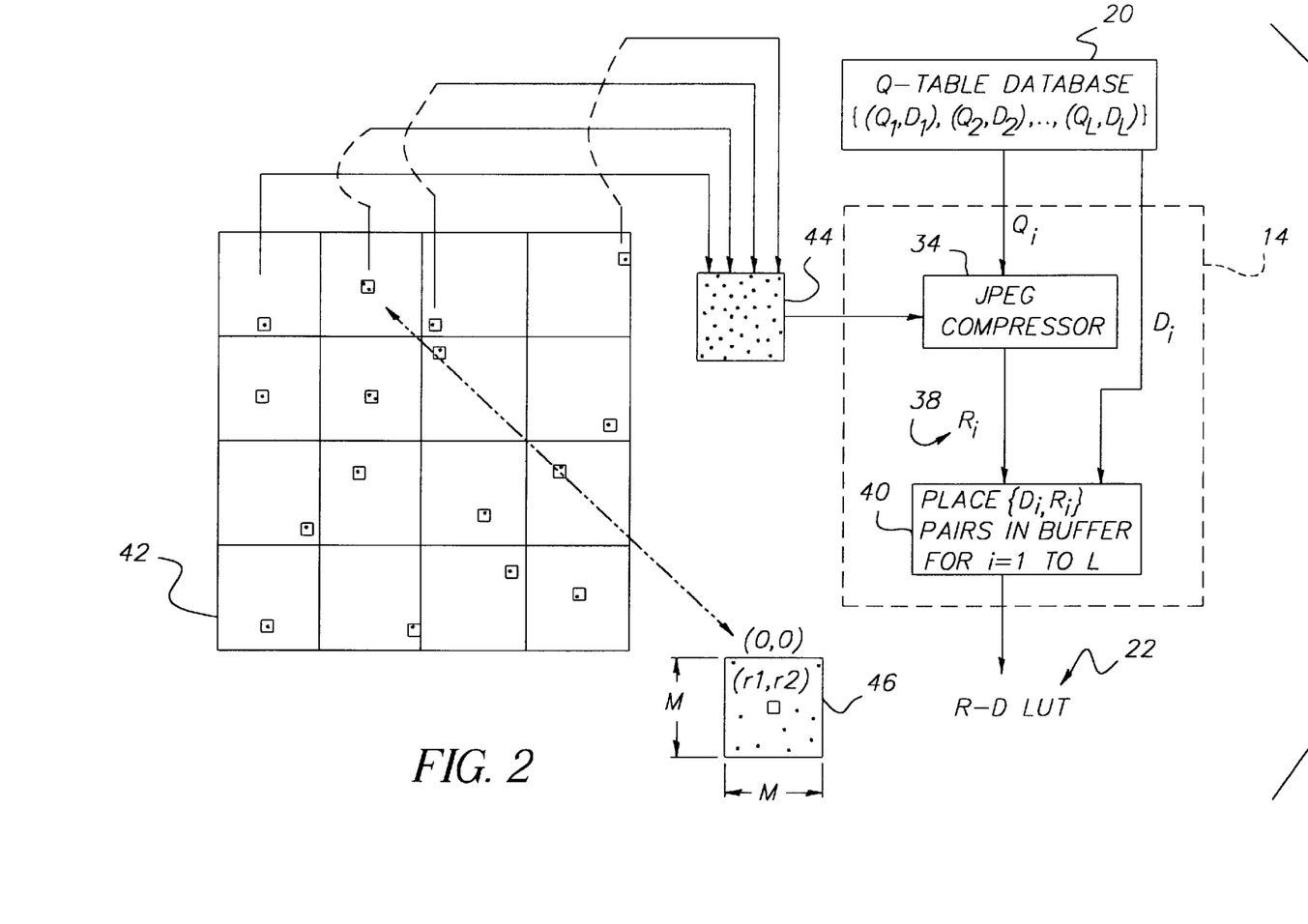
FIG. 2 is a schematic of the pseudo-random block selection strategy and the calculation of the operational R-D characteristics.

For each M×M square (46), we employ a simple random number generator (such as the type found in any "C" language library or the one used in Chapter seven of the book entitled Numerical Recipes in C, ISBN 9780521431088, published by Cambridge University Press in 1992) to generate a first random number $r_1$ and a second random number $r_2$ that are each uniformly distributed between 0 and (M−7). As shown in FIG. 2, these two points form a coordinate $(r_1, r_2)$ in the M×M region, which specifies the top left corner of the randomly selected 8×8-block. The randomly sampled blocks are arranged in the same raster fashion that they have been obtained to form a reduced size image (44), which is then input into the operational R-D calculator module (14). The reduced size image (44) is a collection of the randomly sampled blocks arranged in the same raster order that they have been obtained.

It should be noted that in the preferred embodiment described above, the top-left corner of the randomly selected block can be located anywhere in the range of 0 to M−7 in either direction. This provides more freedom in choosing the value of M, as it does not have to be a factor of 8. In order to make the selected block coincide exactly with an actual image block that will be finally coded by the JPEG compressor, one needs to choose the value of M to be a factor of 8 and also to limit the location of the top-left corner of the randomly selected block to be (8k−1) in each direction where k is an integer. However, we did not notice a difference in performance with our test set of images when the latter strategy was used.

Figure 3:
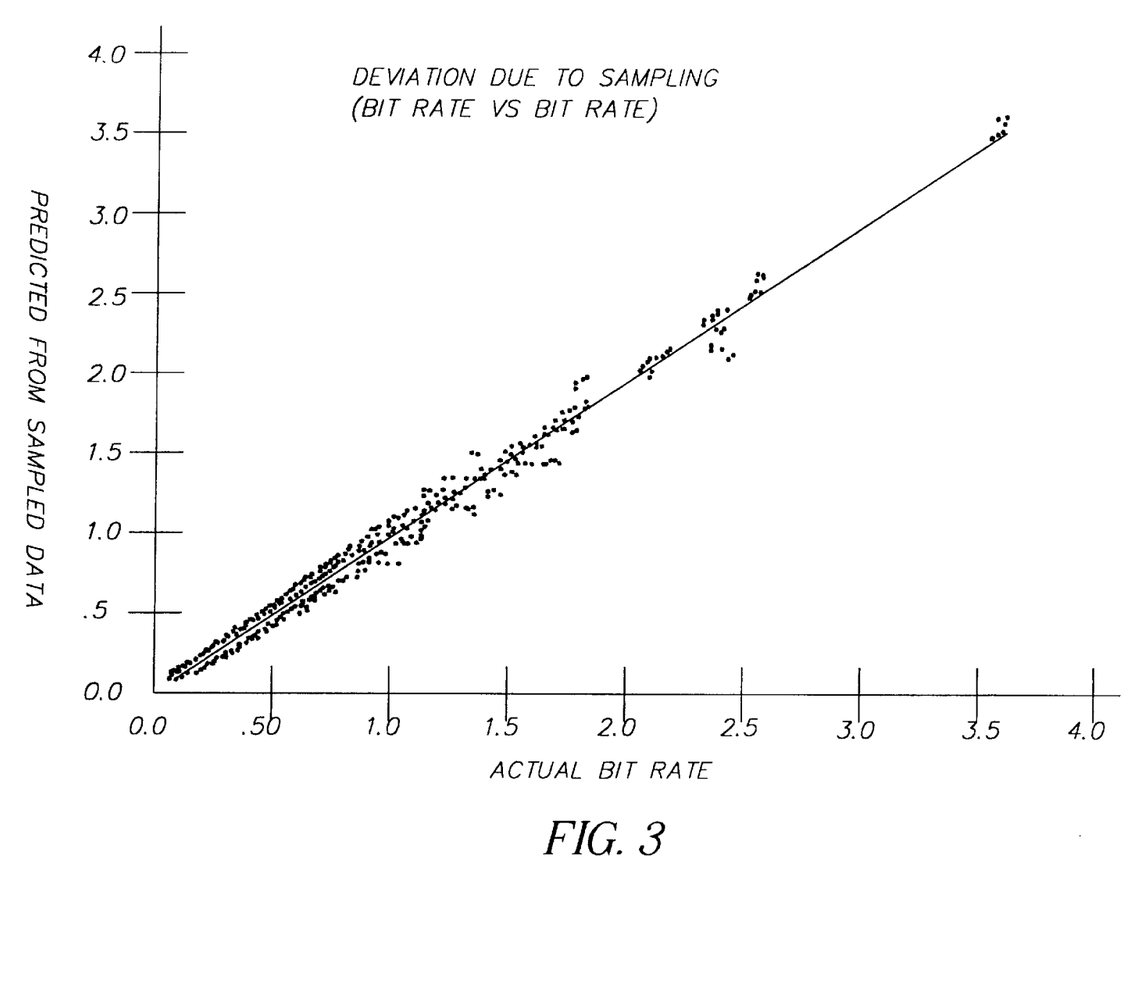
FIG. 3 is a plot of the predicted bit rate resulting from the JPEG compression of only the randomly selected blocks versus the actual bit rate resulting from the JPEG compression of the entire image with the same Q-table.

Based on our experience, the process of pseudo-random sampling works well when the reduction is up to, but not more than, 144 times that of the original image. In FIG. 3, we have plotted the predicted rate obtained from compressing only the pseudo-randomly selected blocks using M=64 versus the actual compression rate obtained by compressing with JPEG the entire image. The plotted data pertain to a 4096×5248 test image from our database. Each point of this plot has been obtained by using the same Q-table for compressing both the original and the pseudo-randomly subsampled images. As is evident from FIG. 3, the predicted rate resulting from the pseudo-random sampling process is fairly accurate in estimating the actual rate of the entire image.

We now describe the process of the Q-table database generation (18) of FIG. 1 in more detail. As mentioned earlier, the characteristics of the HVS are used to derive the Q-table components. Specifically, we make use of the contrast sensitivity function (CSF), which relates to the signal contrast that is required for detection as a function of spatial frequency. A basic description of the CSF can be found in chapter five of "Foundations of Vision," by Brian A. Wandell, ISBN 0-87893-853-2. This reference also includes CSF plots based on measured sensitivities. In many applications that utilize the CSF to design system parameters, it is common to generate the CSF values based on a model of the HVS as compared to making tedious direct measurements. A number of CSF models have been described in the literature, and in a preferred embodiment of the present invention, specific use is made of a model described by Daly in "Application of a noise-adaptive contrast sensitivity function to image data compression," Optical Engineering, Volume 19, number 8, pages 979–987, August 1990. This CSF model displays characteristics similar to the experimentally measured data, e.g., the sensitivity decreases as an increasing function of both horizontal and vertical spatial frequency.

The exact form of the CSF derived from this model is dependent upon a number of viewing condition parameters, including viewing distance, adaptation light level, display noise level, wavelength, and chromatic channel. The CSF is typically presented as a function of spatial cycles per degree of subtended visual angle (i.e., cycles/degree), and to generate the specific Q-table values that correspond to a given CSF, it is necessary to first map the CSF from cycles/degree to cycles/mm (based upon the rendered dots per inch (dpi) of the display and the viewing distance) and then to cycles/pixel (based upon the size of the DCT). Daly in U.S. Pat. No. 4,780,761 describes precisely how to generate a Q-table for a given CSF response.

The use of a CSF model for Q-table generation implies that the compression is being operated at the threshold level for the assumed viewing conditions. That is, if the resulting compressed image is viewed under the assumed viewing conditions, there will be little or no perceptible degradation. Unfortunately, threshold-level compression for a given viewing distance may not provide a sufficient reduction in file size for the intended application. As discussed in the background, it is common to merely scale a basic Q-table (e.g., one that has been derived to operate at the threshold level for a specific set of viewing conditions) to achieve larger amounts of compression and perform rate control. However, given the highly nonlinear nature of the human visual system, a linear scaling of the Q-table elements, although convenient from an implementation standpoint, does not provide a perceptually optimal means of trading image quality for compression ratio.

The present invention overcomes this limitation by realizing that increased compression may be achieved by using CSF-based quantization tables derived for increasing threshold viewing distances. The quality of the resultant compression may then be directly related to the threshold viewing distance used for the generation of Q-table. Using this technique, it can be stated that a compressed image is guaranteed to be visually lossless for all viewing distances greater than the threshold viewing distance used to generate the Q-table. If compressed further, the same image may still be considered as visually lossless if viewed at the larger distance used to derive its corresponding Q-table. Consequently, the threshold viewing distance used in deriving a Q-table can be directly used as the image quality metric.

In a preferred embodiment of the present invention, instead of rescaling a basic Q-table, a completely new Q-table is derived by increasing the viewing distance parameter used in the CSF model and in the subsequent mapping of the CSF response to cycles/mm. An increase in the threshold viewing distance that is used in the CSF model and subsequent Q-table mapping process causes increased quantization, primarily at the higher spatial frequencies, and leads to larger amounts of compression. As far as the visual quality of the resulting compressed image is concerned, for a typical observer, it will still be at a threshold level for the increased viewing distance, i.e., the resulting image would contain little or no perceptible visual degradation if viewed at the increased viewing distance. In a preferred embodiment, the set of Q-tables (20) is generated by using viewing distances $D_i$ that extend from 0.5 inches to 20.0 inches and are spaced at 0.5 inch intervals. The quality parameter used to index each Q-table is the corresponding viewing distance $D_i$. Incrementing the viewing distance by ½-inches will create a dense set of points that results in an accurate characterization of the R-D curve. However, for those applications where computation resources are limited, using a coarser increment of the viewing distance (e.g., 1-inch or larger) will still result in good performance.

Figure 4:
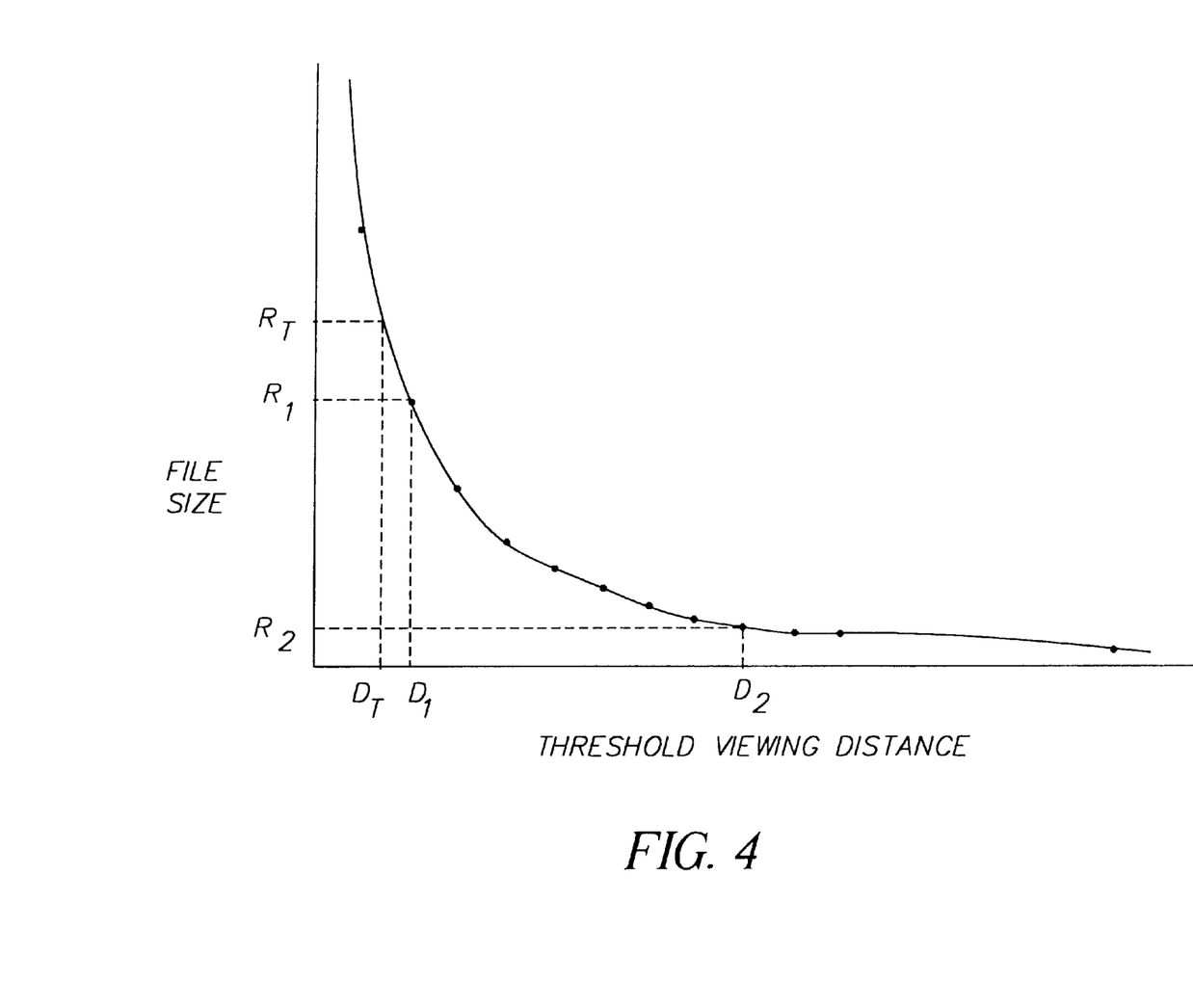
FIG. 4 depicts a situation where the target viewing distance is less than the minimum viewing distance needed by the user.

Referring to FIG. 2, the randomly selected blocks are input into the operational R-D calculator module (14) where they are JPEG compressed with the plurality of Q-tables (20). For each Q-table indexed by a viewing distance $D_i$, the total JPEG compressed file size $R_i$ is determined (38). The resulting set of L data pairs ($D_i$, $R_i$), which constitute the L control points for constructing the operational R-D characteristics of the input image, are stored in a LUT (40). In general, the R-D LUT (22) can be easily interpolated with polynomial functions to form a continuous curve that is usually monotonically decreasing as shown in the example of FIG. 4. Based on our experience, a simple linear interpolation procedure (e.g., connecting any two neighboring points with a straight line) results in a good performance.

Referring again to FIG. 1, the operational R-D LUT and three user-defined parameters, $D_1$ (26), $D_2$ (28), and $R_T$ (30) are input into the rate control module (24). The $D_1$ quality parameter corresponds to the highest image quality that the user is willing to pay for, while the $D_2$ quality parameter corresponds to the lowest image quality that the application can tolerate. In a preferred embodiment of the present invention, the $D_1$ and $D_2$ parameters are expressed as threshold viewing distances that are used to calculate the corresponding highest and lowest visual quality Q-tables. The $R_T$ parameter (30) corresponds to the target file size that is desired for the compressed representation of the digital image (10).

The R-D LUT (22) is used to find the threshold viewing distance $D_T$ at which the compressed image will produce the target rate $R_T$. First, the two file sizes $R_i$ and $R_{i+1}$ and their corresponding viewing distances $D_i$ and $D_{i+1}$ in the R-D LUT (22) are found such that $R_i > R_T > R_{i+1}$. In one embodiment of the present invention, the value of $D_T$ is set to either $D_i$ or $D_{i+1}$, depending on the user specification. In another embodiment, the value of $D_T$ is calculated according to the following relationship, which defines a linear interpolation:

$$D_T = D_{i+1} - \frac{(R_{i+1} - R_T)}{(R_{i+1} - R_i)}(D_{i+1} - D_i)$$

The former procedure results in good performance in those cases where the R-D LUT is densely populated. For example, in our simulations where the R-D LUT contains 40 entries corresponding to viewing distances from 0.5 inches to 20 inches and with 0.5-inch increments, there is no need for interpolation. However, for those applications where only a sparse number of R-D points (e.g., 10 or less) have been calculated, the latter approach for calculating $D_T$ based on linear interpolation is recommended.

Figure 5:
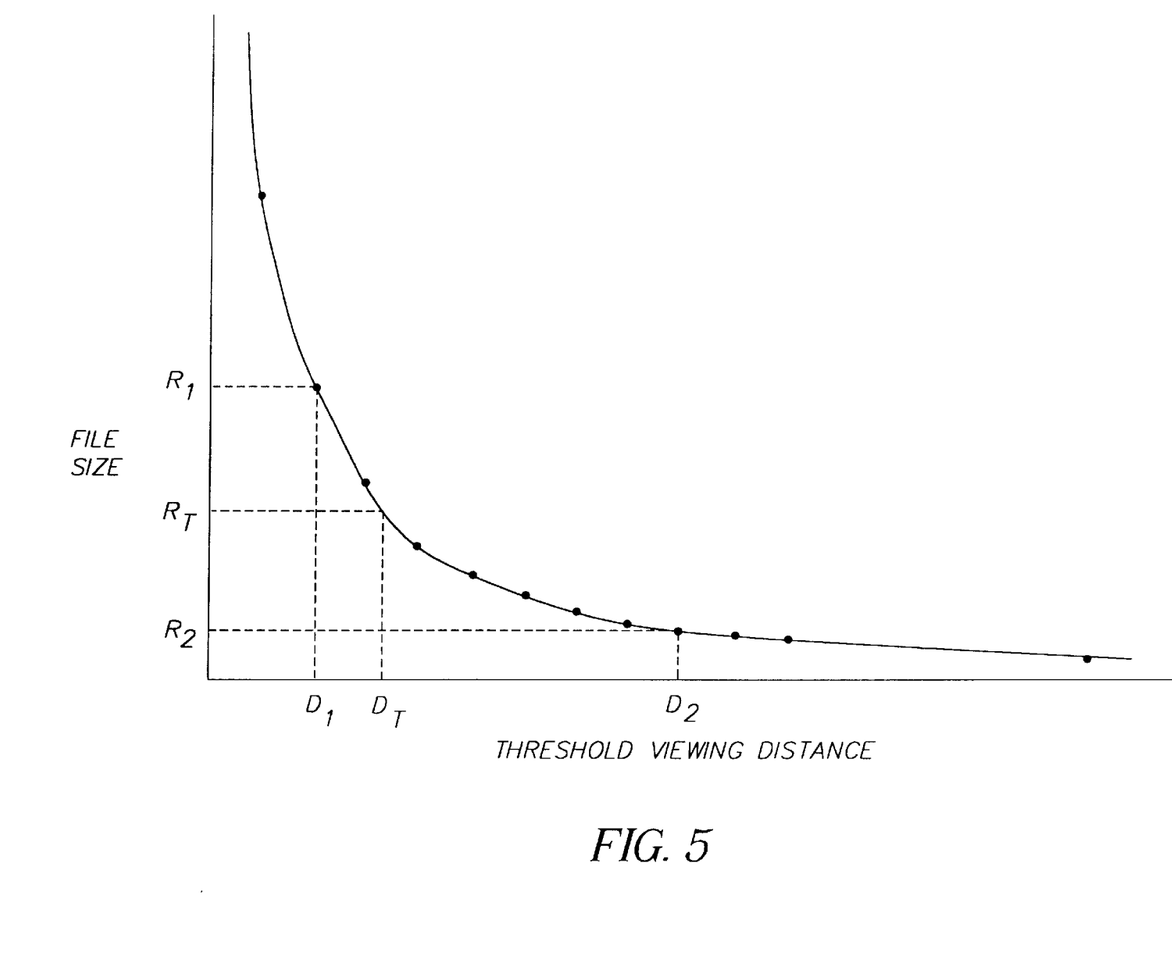
FIG. 5 depicts a situation where the target viewing distance falls between the two levels of quality specified by the user; and, FIG. 6 depicts a situation where the target viewing distance is greater than the maximum allowed by the user.
Figure 6:
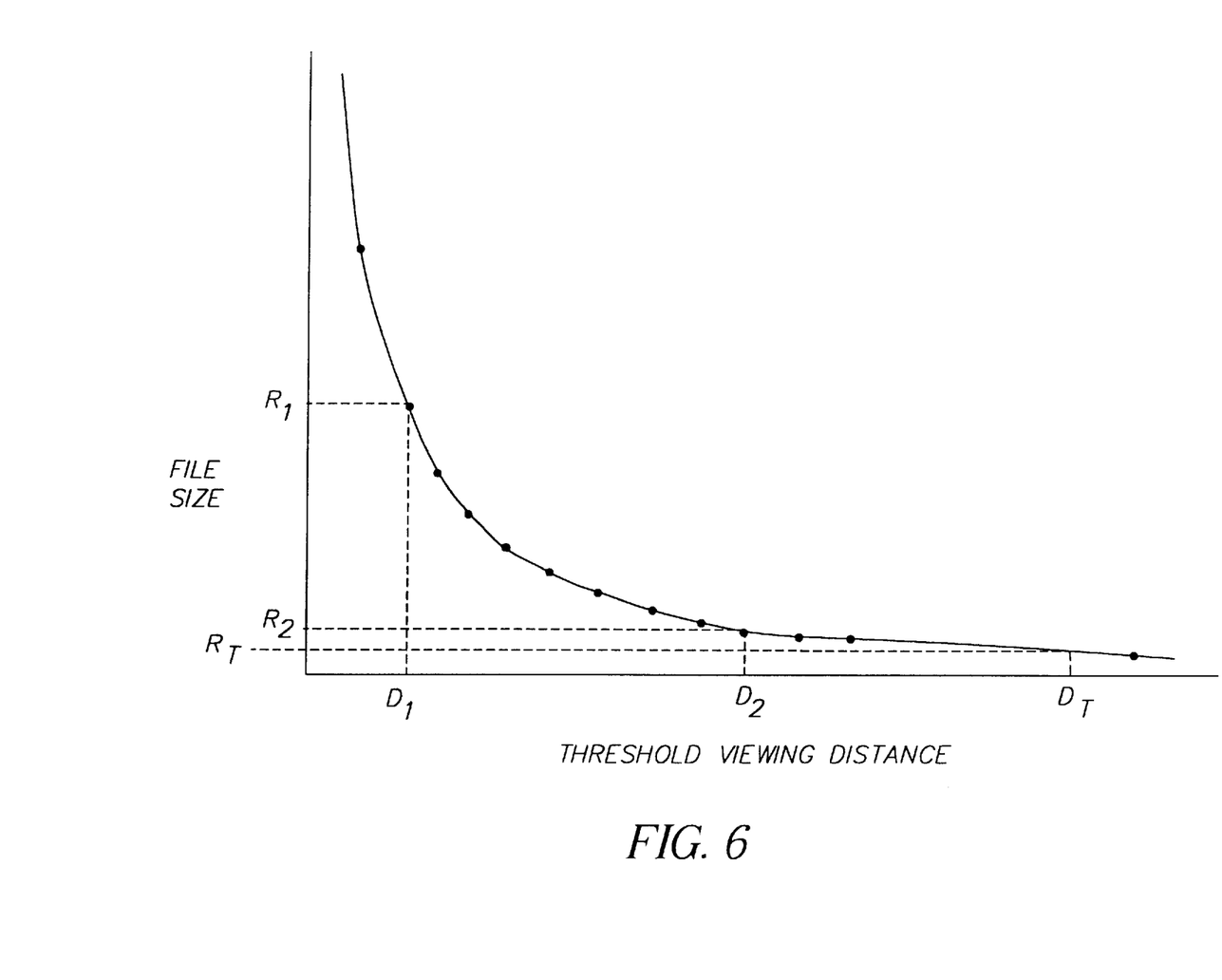

Next, the calculated viewing distance $D_T$ is compared to the two user-specified threshold viewing distances $D_1$ and $D_2$. Three situations can occur as a result of this comparison:

(i) $D_T < D_1$, i.e., the target viewing distance is less than the minimum needed by the user. If the image is compressed to the corresponding target size $R_T$, the resulting quality will be better than the highest quality the user is willing to pay for. This situation is depicted in FIG. 4. In this case, $D_T$ is set equal to $D_1$. In reference to FIG. 1, the selected Q-table $Q_T$ (32) would be the one corresponding to the viewing distance $D_1$. The selected Q-table $Q_T$ is used in the JPEG compression module (34) to create the compressed bit stream (36). Consequently, the resulting compressed file size will be smaller than the target file size $R_T$, while the highest image quality specified will still be obtained;

(ii) $D_1 < D_T < D_2$, i.e., the target viewing distance $D_T$ falls between the two levels of quality specified by the user. This situation is depicted in FIG. 5. In reference to FIG. 1, the selected Q-table $Q_T$ (32) would be the one corresponding to the target viewing distance $D_T$. The selected Q-table $Q_T$ is used in the JPEG compression module (34) to create the compressed bit stream (36). Consequently, the resulting compressed image will achieve the target file size $R_T$, within the accuracy of the operational R-D curve; and, (iii) $D_T > D_2$, i.e., the target viewing distance is greater than the maximum allowed by the user. If the image is compressed to the corresponding target size $R_T$, the resulting quality will be lower than what the application can tolerate. This situation is depicted in FIG. 6. In this case, a warning message to the user is generated, and a user-specified procedure is followed. Examples of such procedures include, but are not limited to: (a) compressing the image with the Q-table $Q_T$ corresponding to a threshold viewing distance $D_2$, thus resulting in a larger file size than targeted but still meeting the minimum quality specification; or (b) compressing the image with the Q-table $Q_T$ derived from $D_T$, thus resulting in a lower quality than is acceptable by the system, but still meeting the target file size specification.

It should be noted that in those cases where the selected Q-table $Q_T$, based on the viewing distance $D_T$, is not a member of the Q-table database (20), it will be generated by the rate control module (24) using the procedure employed in the Q-table generation module (18).

This rate control strategy provides a great flexibility in achieving the compression objectives of various applications. For example, by setting $D_1 = 0$, a rate control system is obtained where the image is always compressed to a target file size $R_T$ unless the resulting quality falls below the user tolerance. On the other hand, by setting $D_1 = D_2$, the image is always compressed to a given quality level as long as the resulting file size is less than the target rate $R_T$.

PARTS LIST 8 image buffer
10 digital image
12 pseudo-random block selection unit
14 operational rate-distortion (R-D) calculation unit
16 display and viewing parameters
18 Q-table database generation unit
20 Q-table set
22 rate-distortion (R-D) lookup table (LUT)
24 rate control module
26 $D_1$ viewing distance, corresponding to the highest quality level specified
28 $D_2$ viewing distance, corresponding to the lowest quality level specified
30 $R_T$ file size, the target file size specified by the application
32 selected Q-table $Q_T$, used to compress the input image
34 JPEG compression unit
36 compressed bit stream
38 $R_i$ compressed file size corresponding to Q-table $Q_i$
40 rate-distortion (R-D) LUT generator
42 tiled input image
44 reduced size image
46 M×M square image region

What is claimed is:

1. A method selecting a quality parameter for use in compressing a digital image, the method comprising the steps of:

(a) creating a plurality of quantizer parameter sets, each having a corresponding quality parameter;

(b) compressing the digital image with the plurality of quantizer parameter sets for providing a corresponding plurality of compressed file sizes;

(c) creating a rate-distortion curve from the plurality of quantizer parameter sets and the corresponding compressed file sizes;

(d) providing a maximum and minimum quality parameters;

(e) providing a target compressed file size; and, (f) selecting a quality parameter based on the rate distortion curve, the maximum and minimum quality parameters and the target compressed file size.

2. The method as in claim 1, wherein step (a) further includes creating the plurality of quantizer parameter sets based on threshold viewing distance with a human visual system model.

3. The method as in claim 1, wherein step (b) further includes compressing the digital image using JPEG compression and using quantization tables as the quantizer parameter sets.

4. The method as in claim 3, wherein step (a) further includes creating the plurality of quantizer parameter sets based on threshold viewing distance with a human visual system model.

5. The method as in claim 1, wherein step (f) further comprises the steps of:
(g) identifying a candidate quality parameter associated with the target compressed file size based on the rate-distortion curve;
(h) selecting the candidate quality parameter if the candidate quality parameter is greater than or equal to the minimum quality parameter and if the candidate quality parameter is less than or equal to the maximum quality parameter;
(i) selecting the quality parameter associated with the maximum quality if the candidate quality parameter is greater than the maximum quality parameter; and,
(j) transmitting a warning signal if the candidate quality parameter is less than the minimum quality parameter.

6. The method as in claim 5, wherein step (a) further includes creating the plurality of quantizer parameter sets based on threshold viewing distance with a human visual system model.

7. The method as in claim 5, wherein step (b) further includes compressing the digital image using JPEG compression and using quantization tables as the quantizer parameter sets.

8. The method as in claim 7, wherein step (a) further includes creating the plurality of quantizer parameter sets based on threshold viewing distance with a human visual system model.

* * * * *